United States Patent [19]
Barron et al.

[11] 4,067,844
[45] Jan. 10, 1978

[54] URETHANE POLYMERS AND SEALANT COMPOSITIONS CONTAINING THE SAME

[75] Inventors: Larry R. Barron, Mentor; Herbert M. Turk, Cleveland, both of Ohio

[73] Assignee: Tremco Incorporated, Cleveland, Ohio

[21] Appl. No.: 753,370

[22] Filed: Dec. 22, 1976

[51] Int. Cl.$^2$ .................. C08L 75/08; C08L 75/04
[52] U.S. Cl. .................. 260/37 N; 260/75 NH; 260/77.5 AM
[58] Field of Search ............ 260/77.5 TB, 77.5 AM, 260/75 TN, 75 NH, 37 N

[56] References Cited
U.S. PATENT DOCUMENTS

| | | | |
|---|---|---|---|
| 3,979,344 | 9/1976 | Bryant | 260/77.5 AM |
| 4,020,043 | 4/1977 | Siefken | 260/77.5 AM |

Primary Examiner—Lewis T. Jacobs

[57] ABSTRACT

Novel, curable polyurethane polymers in which a proportion of the NCO terminations are reacted with certain amino silanes, or with the residual on reaction of a mercaptosilane with a monoepoxide, or with the residual on reaction of an epoxysilane with a secondary amine.

Sealant compositions formed with the novel polymers are stable in storage, moisture curable and adhere well to various substrates, obviating the need for a primer.

21 Claims, No Drawings

URETHANE POLYMERS AND SEALANT COMPOSITIONS CONTAINING THE SAME

BACKGROUND OF THE INVENTION a. Field of the Invention

This invention relates to the polyurethane polymer art, and more particularly to curable polyurethane polymers in which a proportion of the NCO terminations have been reacted with certain silicon-containing materials.

The invention further relates to sealant compositions containing novel silicon modified polyurethane polymers, which sealants are package stable, moisture curable, and adhere well to a variety of substrates without the use of a primer.

b. Description of the Prior Art

Polyurethane polymers containing trialkoxysilane terminations, and sealants comprising such polymers are known in the art.

In U.S. Pat. No. 3,627,722 the preferred reactant with from 5 - 50% of the NCO groups on a polyurethane prepolymer is a monofunctional methyl-aminopropyl-trimethoxy silane. Substitution of a difunctional amino silane, viz., gamma-aminopropyltriethoxysilane, produced unsatisfactory results.

U.S. Pat. No. 3,632,557 discloses producing a useful reaction product of a polyurethane prepolymer with a difunctional aminosilane, viz., gamma-aminopropyl-trimethoxysilane, but here the patentees employ a stoichiometric excess of aminosilane. Thus, the product contains no NCO terminations, only silicon-containing terminations.

U.S. Pat. No. 3,309,261 discloses an adhesive composition comprising a mixture of a polyurethane resin and an aminosilane.

U.S. Pat. No. 3,372,083 discloses use of the reaction product of toluene diisocyanate and gamma-aminopropyltriethoxysilane in a polyurethane sealant composition.

Other reference of general interest in showing the state of the art are U.S. Pats. Nos. 3,387,016; 2,296,471; 2,956,044; 3,088,847; 3,471,541; 3,477,901; 3,829,529; 3,900,679; 3,246,048; 3,450,791; 3,575,910; 3,627,836; 3,644,566; 3,650,812; 3,794,694; 3,808,287; 3,829,527; and 3,893,496.

SUMMARY OF THE INVENTION

In accordance with one aspect of the invention, there is provided a curable organic polymeric material having an average molecular weight within the range of about 1000 to about 15,000 and having at least 2 functional groups per average molecular weight not more than 99% of which are NCO, and the balance being selected from the group consisting of

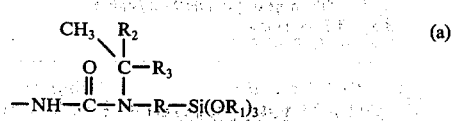  (a)

where:
R is an alkylene of 2-18 carbon atoms
R$_1$ is a lower alkyl of 1-6 carbon atoms
R$_2$ is —H or —CH$_3$
R$_3$ is —C≡N or

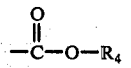

and,

R$_4$ is an alkyl of 1-18 carbon atoms, an epoxyalkyl of 3-8 carbon atoms, an alkoxyalkyl of 2-12 carbon atoms, or —C≡N, and $$-NH-\overset{\overset{\displaystyle O}{\|}}{C}-O-R_5 \qquad (b)$$

where R$_5$ is the residual on reaction of a mercaptosilane with a monoepoxide or an epoxysilane with a secondary amine.

In accordance with another aspect of the invention, there is provided a curable organic polymeric material formed by reacting a polyol having a hydroxyl funtionality in excess of 2 and an average molecular weight within the range of about 1000 to 15,000, with a stoichiometric excess of a polyisocyanate to provide an NCO terminated polyurethane prepolymer, and reacting at least 1% of said NCO terminations with a material selected from the group consisting of

  (a)

where:
R is an alkylene of 2-18 carbon atoms
R$_1$ is a lower alkyl of 1-6 carbon atoms
R$_2$ is —H or —CH$_3$
R$_3$ is —C≡N or

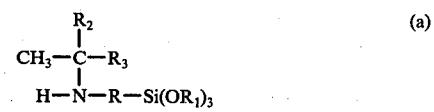

and
R$_4$ is an alkyl of 1-18 carbon atoms, an epoxyalkyl of 3-8 carbon atoms, an alkoxyalkyl of 2-12 carbon atoms, or —C≡N,
b. the reaction product of a mercaptosilane with a monoepoxide, and
c. the reaction product of an epoxysilane with a secondary amine.

The polymeric materials produced in accordance with the present invention when suitably compound with fillers, thixotropic agents, extenders, pigments and other conventional adjuvants form storage stable, moisture curable sealants which adhere with excellent tenacity to, brick, mortar, concrete, stone, glass, steel, aluminum and other structural materials.

When suitably formulated, the polymeric materials may also be useful as coatings and adhesives.

In general, the polymeric materials of the present invention are prepared by reacting a polyol material having a hydroxyl functionality in excess of 2, and preferably at least about 2.3, with a stoichiometric excess of a polyisocyanate; to provide an NCO terminated polyurethane prepolymer.

Thereafter, at least about 1%, and preferably from 2-25% of the NCO terminations are reacted with a silicon containing material of the class defined herein above.

The polyol material, in addition to having a hydroxyl functionality in excess of 2, should have an average molecular weight within the range of about 1000 to about 15,000. The material may be a triol, but is preferably a mixture of at least one diol and at least one triol.

The preferred class of polyols are polyalkylene ether polyols, including polyethylene ether glycol, polypropylene ether glycol, polybutylene ether glycol, polyethylene ether triol, polypropylene ether triol, polybutylene ether triol, etc.

Although less preferred, the invention may be practiced with polyester polyols, i.e., materials prepared from a mixture of polybasic acids of anhydrides and polyols in which the hydroxxyl functionality of the polyester polyol is in excess of 2.

A wide variety of organic polyisocyanates may be used in the practice of the invention, of which aromatic diisocyanates are a preferred class. Examples of these materials include mixtures of 2,4- and 2,6- tolylene diisocyanate, naphthalene -1,5-diisocyanate, and 4,4',4" -triphenylmethane triisocyanate. An especially preferred material is 4,4'-diphenylmethane diisocyanate.

The polyurethane prepolymer can be prepared at room to moderately elevated temperatures, at sub to moderately superatmospheric pressures, in the absence of water, and in the presence of an inert diluent and a catalyst. Preferred catalysts may be taken from the class of organo-polyvalent metal compounds, examples of which are bismuth, antimony and tin octoate, dibutyltin dilaurate, phenylmercuric acetate and di(phenylmercury) dodecenyl succinate.

Other catalysts, Table LXX, P.212, Saunders and Frisch, *Polyurethanes Chemistry and Technology Part I Chemistry.* Interscience Publishers, 1967.

The polymers of the present invention can be prepared by reacting the polyurethane prepolymer with a separately prepared intermediate in the form of certain aminosilanes, or the reaction product of a mercaptosilane with a monoepoxide, or the reaction product of an epoxysilane with a secondary amine. This is the preferred order of addition of materials where the intermediate is in the form of an aminosilane. However, where the intermediate is in the form of the reaction product of a mercaptosilane with a monoepoxide, or an epoxysilane with a secondary amine, it is preferred to form the polyurethane prepolymer in the presence of the intermediates.

Useful intermediates in the form of aminosilanes include the reaction products of aminoalkylalkoxysilanes, such as gamma-aminopropyltrimethoxy silane and gamma-aminopropyltriethoxysilane, with ethyl acrylate, butyl acrylate, 2-ethylhexyl acrylate, cellosolve acrylate, methylemethacrylate, butyl methacrylate, 2-cyanoethyl acrylate, glycidyl acrylate and acrylonitrile.

Other useful intermediates include the reaction products of mercaptosilanes, such as mercaptoalkylalkoxysilanes withh monoepoxides. Specific examples include the reaction products of gamma-mercaptopropyltrimethoxysilane and gamma-mercaptopropyltriethoxysilane with butylene oxide, and styrene oxide.

Still other useful intermediates include the reaction product of an epoxy-silane, such as an epoxyalkylalkoxysilane with a secondary amine. A specific example of this form of intermediate is the reaction product of gamma-glycidoxypropyltrimethoxysilane with di-n-butyl amine.

In preparing sealant compositions the preferred procedure is to form the silane modified polyurethane polymer before introducing fillers, pigments, extenders and other adjuvants. As will be shown, adding these other ingredients to the prepolymer before reaction with the intermediate adversely affects the ability of the sealant to adhere to various substrates, as evidenced by adhesive rather than cohesive failure of the sealant.

DESCRIPTION OF THE PREFERRED EMBODIMENTS

EXAMPLE I

A prepolymer was made according to the following procedure:

| | |
|---|---|
| Polyoxypropylene glycol (28.4 hydroxyl no.) | 4938 g. |
| Polyether triol (27.2 hydroxyl no.) | 5156 g. |
| Toluene (solvent) | 585 g. |
| Diphenylmethane diisocyanate | 1040 g. |
| Stannous octoate | 0.55 ml. |

The first three ingredients were charged to a 12-liter reaction flask, and heated 90° C. under 150 mmHg. absolute pressure. The material refluxed, and the water azeotroped off was collected in a Barrett trap. After 2 hours the flask was cooled to 60° C., the vacuum replaced with a nitrogen blanket, and the remaining ingredients added. The batch was held at 90° C. for 2 hours. The resultant prepolymer had an equivalent weight of about 3800.

An intermediate material was prepared as follows:

| | |
|---|---|
| Gamma-aminopropyltrimethoxysilane | 4.42 ml. |
| Butyl acrylate | 3.56 ml. |
| Toluene (solvent) | 7.98 ml. |

The ingredients were placed in a test tube which was stoppered and shaken, and allowed to stand overnight at 25° C. 12.77 ml. of the intermediate was added to 760 g. of prepolymer. The mixture was stirred and allowed to react at 25° C. for 3 days in a closed container. The resultant fluid material cured to a rubbery elastomer on exposure to the atmosphere, and had good adhesion to both glass and anodized aluminum after 1 month at 25° C., as evidenced by cohesive failure of the polymer. The prepolymer also cured under the same conditions, but its adhesion to glass and to anodized aluminum was poor, as evidenced by adhesive failure of the polymer.

EXAMPLE 3

An intermediate material was prepared by placing the following ingredients into a test tube:

| | |
|---|---|
| Gamma-aminopropyltrimethoxysilane | 4.42 ml. |
| Butyl methacrylate | 3.99 ml. |
| Toluene (solvent) | 8.41 ml. |

The test tube was stoppered and shaken, then allowed to stand for 1 day at 25° C. 13.46 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and to anodized aluminum.

EXAMPLE 3

An intermediate material was prepared by placing the following ingredients into a test tube:

| | |
|---|---|
| Gamma-aminopropyltriethoxysilane | 5.87 ml. |
| Ethyl acrylate | 2.71 ml. |
| Toluene (solvent) | 8.58 ml. |

The test tube was stoppered and shaken, then allowed to stand for 1 day at 25° C. 13.73 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and anodized aluminum, as evidenced by cohesive failure.

EXAMPLE 4

An intermediate material was prepared by placing the following ingredients into a test tube:

| | |
|---|---|
| 2-cyanoethyl acrylate | 2.93 ml. |
| Gamma-aminopropyltrimethoxysilane | 4.42 ml. |
| Toluene (solvent) | 7.35 ml. |

The test tube was stoppered and shaken, then allowed to stand for 1 day at 25° C. 11.76 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 5

An intermediate material was prepared by placing the following ingredients into a test tube:

| | |
|---|---|
| Gamma-aminopropyltrimethoxysilane | 4.42 ml. |
| Cellosolve acrylate | 3.67 ml. |
| Toluene (solvent) | 8.09 ml. |

The test tube was stoppered and shaken, then allowed to stand for 1 day at 25° C. 12.94 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 6

An intermediate material was prepared by placing the following ingredients into a test tube:

| | |
|---|---|
| Gamma-aminopropyltrimethoxysilane | 4.42 ml. |
| Glycidyl acrylate | 2.88 ml. |
| Toluene (solvent) | 7.30 ml. |

The test tube was stoppered and shaken, then allowed to stand for 1 day at 4° C. 11.68 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 7

An intermediate material was prepared by placing the following ingredients into a test tube:

| | |
|---|---|
| Gamma-aminopropyltrimethoxysilane | 4.42 ml. |
| Acrylonitrile | 1.64 ml. |
| Toluene (solvent) | 6.06 ml. |

The test tube was stoppered and shaken, then allowed to stand for 1 day at 25° C. 9.70 ml. of this intermediate was added to 760 g. of the prepolymer of Example 1. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 8

A prepolymer was made according to the following procedure:

| | |
|---|---|
| Polyoxpropylene diol (38.3 hydroxyl no.) | 6152 g. |
| Polyether triol (26.7 hydroxyl no.) | 3872 g. |
| Toluene (solvent) | 590 g. |
| 4,4' Diphenylmethane diisocyanate | 1275 g. |
| Stannous octoate | 0.56 ml. |

The first three ingredients were placed in a 12-liter reaction flask. A water-solvent azeotrope was refluxed for 2 hours at 90° C. and 150 mmHg. absolute pressure, the water collecting in a Barrett trap. The temperature was then reduced to 60° C., the flask was flooded with nitrogen at atmospheric pressure, and the remaining ingredients added, as evidenced by cohesive failure. The batch was held at 90° C. for 10 hours. The resultant prepolymer had an isocyanate equivalent weight of about 2800.

An intermediate material was prepared by placing the following ingredients into a test tube:

| | |
|---|---|
| Butylene oxide | 2.18 ml. |
| Gamma-mercaptopropyltrimethoxysilane | 4.08 ml. |
| Toluene (solvent) | 6.26 ml. |

The test tube was stoppered and shaken, then allowed to stand for 1 day at 25° C. 8.1 ml. of this intermediate was added to 424 g. of the prepolymer of this Example. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 9

An intermediate material was prepared by placing the following ingredients into a test tube:

| | |
|---|---|
| Gamma-glycidoxypropyltrimethoxysilane | 5.52 ml. |
| Di-n-Butyl amine | 4.24 ml. |
| Toluene (solvent) | 9.76 ml. |

The test tube was stoppered and shaken, then allowed to stand for 1 day at 25° C. 11.7 ml. of this intermediate was added to 424 g. of the prepolymer of Example 8.

The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 10

An intermediate material was prepared by placing the following ingredients into a test tube:

| | |
|---|---|
| Styrene oxide | 3.35 ml. |
| Gamma-mercaptopropyltrimethoxysilane | 4.08 ml. |
| Toluene (solvent) | 7.43 ml. |

The test tube was stoppered and shaken, then allowed to stand for 1 day at 25° C. 8.9 ml. of this intermediate was added to 424 g. of the prepolymer of Example 8. The mixture was stirred and allowed to react for 3 days at 25° C. The resultant fluid material cured on exposure to the atmosphere to a rubbery elastomer with good adhesion to glass and to anodized aluminum, as evidenced by cohesive failure.

EXAMPLE 11

An intermediate material was prepared by placing the following ingredients into a test tube:

| | |
|---|---|
| Gamma-aminopropyltrimethoxysilane | 4.42 ml. |
| Toluene (solvent) | 4.42 ml. |

The test tube was stoppered and shaken, then allowed to stand for 1 day at 25° C. 7.07 ml. of this intermediate was added to 760 g. of the prepolymer of Example 1. The mixture was stirred and allowed to react for three days at 25° C. The resultant fluid material cured on exposure to the atmosphere to a rubbery elastomer with good adhesion to glass and to anodized aluminum. However, the material was higher in viscosity than the other materials, and increased in viscosity on aging twice as fast on the average, as did the materials in the previous examples, indicating a lack of storage stability.

EXAMPLE 12

A pigmented prepolymer was prepared by the following method:

| | |
|---|---|
| Polyether triol (26.9 hydroxyl no.) | 5839 g. |
| Calcium carbonate | 3118 g. |
| Rutile titanium dioxide | 879 g. |
| Toluene (solvent) | 1726 g. |
| 4,4′ Diphenylmethane diisocyanate | 735 g. |
| Stannous octoate | 0.45 ml. |

The first three ingredients were agitated at high shear to a 5½ Hegman grind. This mix was placed in a 12-liter reaction flask, and the mixing kettle was rinsed with the solvent which was also added to the flask. The flask was then heated to reflux and held for 4 hours at 110° C. under a nitrogen blanket, the azeotroped water being collected in a Barrett trap. 511 g. of the solvent was then distilled off. The batch was then held at 95° C. for 3 hours and packaged.

To 478 g. portions of this prepolymer the following materials were added:
 a. 7.98 ml. of the intermediate of Example 1.
 b. 8.41 ml. of the intermediate of Example 2.
 c. 8.58 ml. of the intermediate of Example 3.
 d. 7.35 ml. of the intermediate of Example 4.
 e. 8.09 ml. of the intermediate of Example 5.
 f. 7.30 ml. of the intermediate of Example 6.
 g. 6.06 ml. of the intermediate of Example 7.

All of these batches were stirred and allowed to react for 3 days at 25° C. before being cured. All cured to a rubbery elastomeric state, but none showed any improvement in adhesion compared to the prepolymer without the above additions, as evidenced by their adhesive failure.

Having thus described our invention, we claim:

1. A curable organic polymeric material having an average molecular weight within the range of about 1000 to about 15,000 and having at least 2 functional groups per average molecular weight not more than 99% of which are NCO, and the balance being selected from the group consisting of

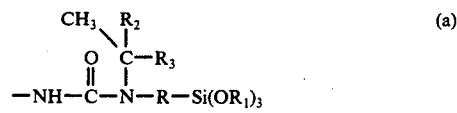

where
 R is an alkylene of 2-18 carbon atoms
 $R_1$ is a lower alkyl of 1-6 carbon atoms
 $R_2$ is —H or —$CH_3$
 $R_3$ is —C≡N or

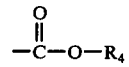

and,
 $R_4$ is an alkyl of 1-18 carbon atoms, an epoxyalkyl of 3-8 carbon atoms, an alkoxyalkyl of 2-12 carbon atoms, or —C≡N, and

where $R_5$ is the residual on reaction of a mercaptosilane with a monoepoxide or an epoxysilane with a secondary amine.

2. The curable organic polymeric material of claim 1 wherein about 75-98% of said functional groups are NCO.

3. The curable organic polymeric material of claim 2 wherein the balance of said functional groups are the residual on reaction of an NCO group with the reaction product of gamma-aminopropyltrimethoxysilane and butyl acrylate.

4. The curable organic polymeric material of claim 2 wherein the balance of said functional groups are the residual on reaction of an NCO group with the reaction product of gamma-aminopropyltrimethoxysilane and ethyl acrylate.

5. The curable organic polymeric material of claim 2 wherein the balance of said functional groups are the residual on reaction of an NCO group with the reaction product of gamma-mercaptopropyltrimethoxysilane and butylene oxide.

6. The curable organic polymeric material of claim 2 wherein the balance of said functional groups are the residual on reaction of an NCO group with the reaction product of gamma-glycidoxypropyltrimethoxysilane and di-n-butyl amine.

7. The curable organic polymeric material of claim 2 wherein the balance of said function groups are the residual on reaction of an NCO group with the reaction product of gamma-aminopropyltrimethoxysilane and acrylonitrile.

8. A curable organic polymeric material formed by reacting a polyol having a hydroxyl functionality in excess of 2 and an average molecular weight within the range of about 1000 to 15,000 with a stoichiometric excess of a polyisocyanate to provide an NCO terminated polyurethane prepolymer, and reacting at least 1% of said NCO terminations with a material selected from the group consisting of

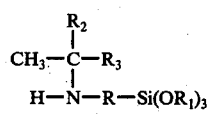 (a)

where
R is an alkylene of 2-18 atoms
$R_1$ is a lower alkyl of 1-6 carbon atoms
$R_2$ is —H or —$CH_3$
$R_3$ is —C≡N or

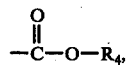

and
$R_4$ is an alkyl of 1-18 carbon atoms, an epoxyalkyl of 3-8 carbon atoms, an alkoxyalkyl of 2-12 carbon atoms, or —C≡N,
b. the reaction product of a mercaptosilane with a monoepoxide, and
c. the reaction product of an epoxysilane with a secondary amine.

9. The curable organic polymeric material of claim 8 wherein from about 2-25% of said NCO terminations are so reacted.

10. A sealant composition comprising the curable organic polymeric material according to claim 1.

11. A sealant composition according to claim 10 further comprising fillers and pigments.

12. A sealant composition comprising the curable organic polymeric material according to claim 8.

13. A sealant composition according to claim 12 further comprising fillers and pigments.

14. A cured sealant according to claim 10.
15. A cured sealant according to claim 11.
16. A cured sealant according to claim 12.
17. A cured sealant according to claim 13.

18. A method of forming a sealant composition having improved adhesion comprising the steps of reacting a polyol having a hydroxyl functionality in excess of 2 and an average molecular weight within the range of about 1000 to 15,000 with a stoichiometric excess of a polyisocyanate to provide an NCO terminated polyurethane prepolymer, reacting at least 1% of said NCO terminations with a material selected from the group consisting of

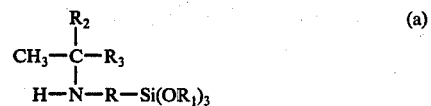 (a)

where
R is an alkylene of 2-18 carbon atoms
$R_1$ is a lower alkyl of 1-6 carbon atoms
$R_2$ is —H or —$CH_3$
$R_3$ is —C≡N or

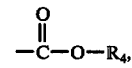

and
$R_4$ is an alkyl of 1-18 carbon atoms, an epoxyalkyl of 3-8 carbon atoms, an alkoxyalkyl or 2-12 carbon atoms, or —C≡N,
b. the reaction product of a mercaptosilane with a monoepoxide, and
c. the reaction product of an epoxysilane with a secondary amine, thereby forming a silane modified polyurethane polymer, and with fillers and pigments to form a sealant composition.

19. The method defined in claim 18 wherein said material is (b) and it is present during the reaction of said polyol and said polyisocyanate.

20. The method defined in claim 18 wherein said material is (c) and it is present during the reaction of said polyol and said polyisocyanate.

21. The method defined in claim 18 wherein said material is (a) and it is added after reaction of the polyol and the polyisocyanate is substantially complete.

* * * * *